(12) United States Patent
Song et al.

(10) Patent No.: US 9,973,750 B2
(45) Date of Patent: May 15, 2018

(54) METHOD AND DEVICE FOR IMAGE ENCODING/DECODING USING BLOCK SPLIT PREDICTION

(75) Inventors: Jinhan Song, Seoul (KR); Jeongyeon Lim, Gyeonggi-do (KR); Yoonsik Choe, Gyeonggi-do (KR); Yonggoo Kim, Seoul (KR); Yung Ho Choi, Gyeonggi-Do (KR); Sang Jae Park, Busan (KR)

(73) Assignee: SK TELECOM CO., LTD., Seoul (KR)

( * ) Notice: Subject to any disclaimer, the term of this patent is extended or adjusted under 35 U.S.C. 154(b) by 876 days.

(21) Appl. No.: 13/812,026

(22) PCT Filed: Jul. 29, 2011

(86) PCT No.: PCT/KR2011/005620
§ 371 (c)(1),
(2), (4) Date: Apr. 25, 2013

(87) PCT Pub. No.: WO2012/015275
PCT Pub. Date: Feb. 2, 2012

(65) Prior Publication Data
US 2013/0202030 A1 Aug. 8, 2013

(30) Foreign Application Priority Data
Jul. 29, 2010 (KR) .................. 10-2010-0073208

(51) Int. Cl.
*H04N 19/119* (2014.01)
*H04N 19/176* (2014.01)
(Continued)

(52) U.S. Cl.
CPC ..... *H04N 19/00569* (2013.01); *H04N 19/105* (2014.11); *H04N 19/136* (2014.11);
(Continued)

(58) Field of Classification Search
CPC .... H04N 19/176; H04N 19/61; H04N 19/105; H04N 19/70; H04N 19/109; H04N 19/51;
(Continued)

(56) References Cited

U.S. PATENT DOCUMENTS

2008/0175491 A1* 7/2008 Kondo .............. G06F 17/30247
382/232
2008/0240246 A1* 10/2008 Lee ...................... H04N 19/176
375/240.16
(Continued)

FOREIGN PATENT DOCUMENTS

JP 2010135864 A1 6/2010
KR 10-0178230 5/1999
(Continued)

OTHER PUBLICATIONS

Yang et al., "Description of video coding technology proposal by Huawei Technologies & Silicon Technologies", Joint Collaborative Team on Video Coding (JCT-VC) of ITU-T SG16 WP3 and ISO/IEC JTC1/SC29/WG11 1st Meeting: Dresden, DE, Apr. 15-23, 2010, Document: JCTVC-A111, Section 2.*
(Continued)

*Primary Examiner* — Tsion B Owens
*Assistant Examiner* — Alison Slater
(74) *Attorney, Agent, or Firm* — Hauptman Ham, LLP

(57) ABSTRACT

A video encoding/decoding method and apparatus using split prediction is provided.
The video encoding/decoding method and apparatus using split prediction splits a block into various partition shapes in addition to a conventional standardized right-angled quadrangular shape so as to effectively predict an image of a current block from a previous image and thus, may more improve the performance of video data compression and may achieve superior reconstructed image quality.

9 Claims, 7 Drawing Sheets

(51) Int. Cl.
  H04N 19/61    (2014.01)
  H04N 19/14    (2014.01)
  H04N 19/50    (2014.01)
  H04N 19/105   (2014.01)
  H04N 19/139   (2014.01)
  H04N 19/46    (2014.01)
  H04N 19/593   (2014.01)
  H04N 19/136   (2014.01)

(52) U.S. Cl.
  CPC ......... *H04N 19/139* (2014.11); *H04N 19/176* (2014.11); *H04N 19/46* (2014.11); *H04N 19/593* (2014.11); *H04N 19/61* (2014.11)

(58) Field of Classification Search
  CPC .... H04N 19/54; H04N 19/543; H04N 19/119; H04N 19/14; G06T 9/20; G06T 9/004; G06T 7/2033
  See application file for complete search history.

(56) References Cited

U.S. PATENT DOCUMENTS

| | | | | |
|---|---|---|---|---|
| 2009/0196342 | A1* | 8/2009 | Divorra Escoda | H04N 19/50 375/240.02 |
| 2011/0002388 | A1* | 1/2011 | Karczewicz | H04N 19/00733 375/240.15 |
| 2012/0106645 | A1* | 5/2012 | Lin | H04N 19/577 375/240.16 |
| 2013/0129237 | A1* | 5/2013 | Yie | G06T 9/004 382/233 |

FOREIGN PATENT DOCUMENTS

| | | | | |
|---|---|---|---|---|
| KR | 10-0181063 | 5/1999 | | |
| KR | 10-0235345 | 12/1999 | | |
| KR | 1020100053186 A | * | 7/2010 | ............. G06T 9/004 |

OTHER PUBLICATIONS

Davies et al., "Suggestion for a Test Model", Joint Collaborative Team on Video Coding (JCT-VC) of ITU-T SG16 WP3 and ISO/IEC JTC1/SC29/WG11 1st Meeting: Dresden, DE, Apr. 15-23, 2010, Document: JCTVC-A033, entire document.*

Davies et al., "Suggestion for a Test Model", Joint Collaborative Team on Video Coding (JCT-VC) of ITU-T SG16 WP3 and ISO/IEC JTC1/SC29/WG11 1st Meeting: Dresden, DE, Apr. 15-23, 2010, Document: JCTVC-A303 r3, Sect. 4.*

Zheng et al., "Flexible macroblock partition for inter-frame coding", Joint Collaborative Team on Video Coding (JCT-VC) of ITU-T SG16 WP3 and ISO/IEC JTC1/SC29/WG11 1st Meeting: Dresden, DE, Apr. 15-23, 2010, Document: JCTVC-A029, entire document.*

Zheng et al., Flexible macroblock partition for inter-frame coding, Joint Collaborative Team on Video Coding (JCT-VC) of ITU-T SG16 WP3 and ISO/IEC JTC1/SC29/WG11 1st Meeting: Dresden, DE, Apr. 15-23, 2010, JCTVC-A029.*

Krutz et al., Tool Experiment 2: Inter Prediction in HVEC, Joint Collaborative Team on Video Coding (JCT-VC) of ITU-T SG16 WP3 and ISO/IEC JTC1/SC29/WG11 2nd Meeting: Geneva, Switzerland, Jul. 21-28, 2010, JVTVC-B303.*

Zheng et al., TE3: Huawei & Hisilicon report on flexible motion partitioning coding, Joint Collaborative Team on Video Coding (JCT-VC) of ITU-T SG16 WP3 and ISO/IEC JTC1/SC29/WG11 2nd Meeting: Geneva, CH, Jul. 21-28, 2010, JCTVC-B041r2.*

International Search Report dated Mar. 9, 2012 for PCT/KR2011/005620, citing the above reference(s).

* cited by examiner

METHOD AND DEVICE FOR IMAGE ENCODING/DECODING USING BLOCK SPLIT PREDICTION

CROSS REFERENCE TO RELATED APPLICATION

This application claims the priority of Korean Patent Application No. 10-2010-0073208, filed on Jul. 29, 2010 in the KIPO (Korean Intellectual Property Office). Further, this application is the National Phase application of International Application No. PCT/KR2011/005620 filed on Jul. 29, 2011, which designates the United States and was published in Korean.

TECHNICAL FIELD

The present disclosure relates to a video encoding/decoding method and apparatus using block split prediction. More particularly, the present disclosure relates to a video encoding/decoding method and apparatus using block split prediction that splits a block into various partition shapes in addition to a conventional standardized right-angled quadrangular shape so as to effectively predict an image of a current block from a previous image and thus, the performance of video data compression can be further improved and a superior reconstructed image quality can be achieved.

BACKGROUND

The statements in this section merely provide background information related to the present disclosure and may not constitute prior art.

An inter-screen prediction method in a video data compressing apparatus is for predicting an image that is currently desired to be encoded based on a previous image that is already encoded and reconstructed. According to the conventional H.264/AVC, a method is provided that obtains a block most similar to a current block from a previous image, by splitting a block into a plurality of square shapes. However, the method may have a drawback in that efficiency in prediction is deteriorated when a correlation among frames decreases since an object image and a background image overlap each other in a single block or illuminance is significantly changed.

Recently, there has been introduced a scheme of splitting a block into asymmetric rectangular shapes as opposed to the conventional scheme of splitting a block into square shapes to overcome the drawback. According to the scheme, effective compression may be performed when an object image and a background image have an asymmetric layout in a current block that is desired to be encoded. However, when the object image and the background image are provided in an arbitrary shape other than a rectangular shape including predetermined asymmetry, block splitting to distinguish an object and a background may not be accurately performed and thus, the performance may be limited. As a solution to the limitation, there has been provided a scheme that allows splitting in an arbitrary direction using length and angle information in a block split process. However, in the process of quantizing the length and angle information, it has a drawback in that the accuracy of a split direction may decrease, and the efficiency of compression may be deteriorated unless an effective information transmitting scheme is provided since an amount of data to be additionally transmitted increases.

DISCLOSURE

Technical Problem

An aspect of the present disclosure to solve the above-mentioned problem provides a superior restored image quality through improving the performance of video data compression by splitting a block into various shapes in addition to a conventional standardized rectangular shape so as to effectively predict an image of a current block from a previous image in a motion image predicting process of a data compressing apparatus.

SUMMARY

An aspect of the present disclosure provides a video encoding/decoding apparatus, the apparatus including: a video encoder to split a current block into a plurality of partitions using one or more curves, to generate a predicted block by performing prediction for each split partition, to generate a residual block by subtracting the predicted block from the current block, to generate a transformed and quantized residual block by transforming and quantizing the residual block, and to encode the transformed and quantized residual block; and a video decoder to reconstruct a transformed and quantized residual block by receiving encoded data, to reconstruct a residual block by inverse-quantizing and inverse-transforming the reconstructed transformed and quantized residual block, to extract split information from adjacent block information or the encoded data, to generate a predicted block by predicting a current block for each partition based on the split information, and to reconstruct the current block by adding the reconstructed residual block and the predicted block.

Another aspect of the present disclosure provides a video encoding apparatus, the apparatus including: an inter-predictor to generate split candidates by splitting a current block using a set of one or more lines connecting points on two sides of the current block, to generate candidate blocks by performing prediction for each partition of the current block split by the one or more lines with respect to each split candidate, to generate, to be a predicted block, a candidate block that has pixel values most similar to the current block from among the generated candidate blocks; a subtractor to generate a residual block by subtracting the predicted block from the current block; a transformer and quantizer to generate a transformed and quantized residual block by transforming and quantizing the residual block; and an encoder to encode the transformed and quantized residual block.

Another aspect of the present disclosure provides a video encoding apparatus, the apparatus including an inter-predictor to extract a predetermined number of feature points from a current block, to select a matching block having a distribution of feature points similar to a distribution of the extracted feature points, and to generate the matching block to be a predicted block; a subtractor to generate a residual block by subtracting the predicted block from the current block; a transformer and quantizer to generate a transformed and quantized residual block by transforming and quantizing the residual block; and an encoder to encode the transformed and quantized residual block.

Another aspect of the present disclosure provides a video encoding apparatus, the apparatus including: an inter-predictor to generate a predicted motion vector from a motion vector of an adjacent block, to extract split information of a current block from a block referred to by the predicted-motion vector, to generate a predicted block by predicting the current block based on the split information; a subtractor to generate a residual block by subtracting the predicted block from the current block; a transformer and quantizer to generate a transformed and quantized residual block by transforming and quantizing the residual block; and an encoder to encode the transformed and quantized residual block.

Another aspect of the present disclosure provides a video encoding apparatus, the apparatus including: an inter-predictor to generate a reference template based on pixel information of an adjacent block, to extract, from a previously encoded block, a predicted template having pixel values with the smallest error or variation from the reference template, to extract split information of a current block from a central block of the predicted template, and to generate a predicted block by predicting the current block based on the split information; a subtractor to generate a residual block by subtracting the predicted block from the current block; a transformer and quantizer to generate a transformed and quantized residual block by transforming and quantizing the residual block; and an encoder to encode the transformed and quantized residual block.

Another aspect of the present disclosure provides a video decoding apparatus, the apparatus including: a decoder to reconstruct split information of a current block and a transformed and quantized residual block by receiving encoded data; an inverse-quantizer and inverse-transformer to reconstruct a residual block by inverse-quantizing and inverse-transforming the transformed and quantized residual block; an inter-predictor to generate a predicted block by predicting the current block for each partition based on the split information; and an adder to reconstruct the current block by adding the reconstructed residual block and the predicted block.

Another aspect of the present disclosure provides a video decoding apparatus, the apparatus including: a decoder to reconstruct a transformed and quantized residual block by receiving encoded data; an inverse-quantizer and inverse-transformer to reconstruct a residual block by inverse-quantizing and inverse-transforming the transformed and quantized residual block; an inter-predictor to extract split information of a current block from an adjacent block, to generate a predicted block by predicting the current block for each partition based on the split information; and an adder to reconstruct the current block by adding the reconstructed residual block and the predicted block.

Another aspect of the present disclosure provides a video encoding/decoding method, the method including: a video encoding step to split a current block into a plurality of partitions using one or more curves, to generate a predicted block by performing prediction for each split partition, to generate a residual block by subtracting the predicted block from the current block, to generate a transformed and quantized residual block by transforming and quantizing the residual block, and to encode the transformed and quantized residual block; and a video decoding step to reconstruct a transformed and quantized residual block by receiving encoded data, to reconstruct a residual block by inverse-quantizing and inverse-transforming the reconstructed transformed and quantized residual block, to extract split information from adjacent block information or the encoded data, to generate a predicted block by predicting a current block for each partition based on the split information, and to reconstruct the current block by adding the reconstructed residual block and the predicted block.

Another aspect of the present disclosure provides a video encoding method, the method including an inter-prediction step to generate split candidates by splitting a current block using a set of one or more lines connecting points on two sides of the current block, to generate candidate blocks by performing prediction for each partition of the current block split by the one or more lines with respect to each split candidate, to generate, to be a predicted block, a candidate block that has pixel values most similar to the current block from among the generated candidate blocks; a subtraction step to generate a residual block by subtracting the predicted block from the current block; a transform and quantization step to generate a transformed and quantized residual block by transforming and quantizing the residual block; and an encoding step to encode the transformed and quantized residual block.

Another aspect of the present disclosure provides a video encoding method, the method including: an inter-prediction step to extract a predetermined number of feature points from a current block, to select a matching block having a distribution of feature points similar to a distribution of the extracted feature points, and to generate the matching block to be a predicted block; a subtraction step to generate a residual block by subtracting the predicted block from the current block; a transform and quantization step to generate a transformed and quantized residual block by transforming and quantizing the residual block; and an encoding step to encode the transformed and quantized residual block.

Another aspect of the present disclosure provides a video encoding method, the method including: an inter-prediction step to generate a predicted motion vector from a motion vector of an adjacent block, to extract split information of a current block from a block referred to by the predicted-motion vector, to generate a predicted block by predicting the current block based on the split information; a subtraction step to generate a residual block by subtracting the predicted block from the current block; a transform and quantization step to generate a transformed and quantized residual block by transforming and quantizing the residual block; and an encoding step to encode the transformed and quantized residual block.

Another aspect of the present disclosure provides a video encoding method, the method including: an inter-prediction step to generate a reference template based on pixel information associated with an adjacent block, to extract, from a previously encoded block, a predicted template having pixel values with the smallest variation from the reference template, to extract split information of a current block from a central block of the predicted template, and to generate a predicted block by predicting the current block based on the split information; a subtraction step to generate a residual block by subtracting the predicted block from the current block; a transform and quantization step to generate a transformed and quantized residual block by transforming and quantizing the residual block; and an encoding step to encode the transformed and quantized residual block.

Another aspect of the present disclosure provides a video decoding method, the method including: a decoding step to reconstruct split information of a current block and a transformed and quantized residual block by receiving encoded data; an inverse-quantization and inverse-transform step to reconstruct a residual block by inverse-quantizing and inverse-transforming the transformed and quantized residual block; an inter-prediction step to generate a predicted block by predicting the current block for each partition based on the split information; and an adding step to reconstruct the current block by adding the reconstructed residual block and the predicted block.

Another aspect of the present disclosure provides a video decoding method, the method including: a decoding step to reconstruct a transformed and quantized residual block by receiving encoded data; an inverse-quantization and inverse-transform step to reconstruct a residual block by inverse-quantizing and inverse-transforming the transformed and quantized residual block; an inter-prediction step to extract split information of a current block from an adjacent block, to generate a predicted block by predicting the current block for each partition based on the split information; and an adding step to reconstruct the current block by adding the reconstructed residual block and the predicted block.

Advantageous Effects

According to the present disclosure as described above, a block is split into various shapes in addition to a conventional standardized rectangular shape so as to effectively predict an image of a current block from a previous image in a motion image predicting process of a data compressing apparatus and thus, the performance of video data compression may be further improved and a superior restored image quality may be obtained.

DETAILED DESCRIPTION

Figure 1:
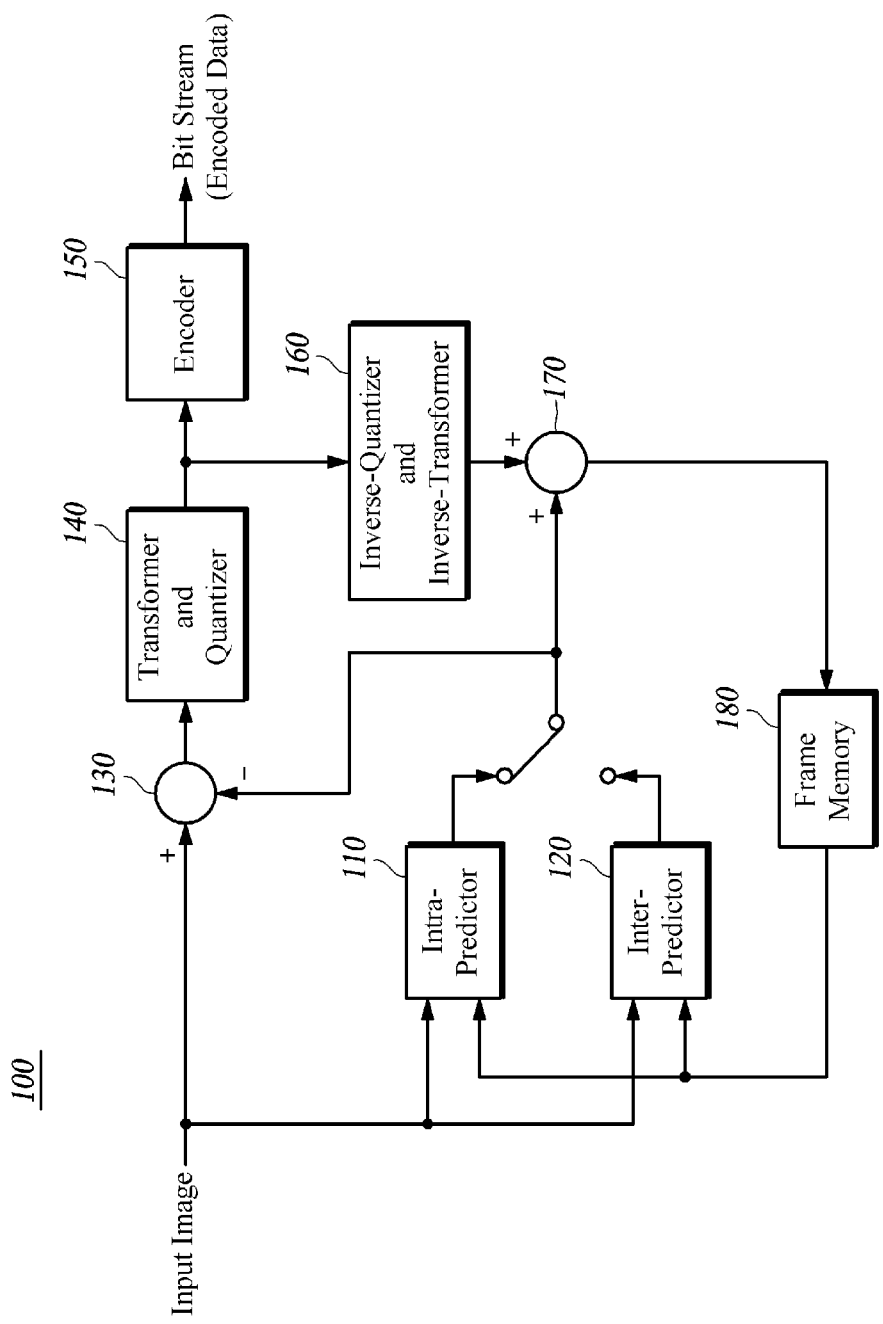
FIG. 1 is a block diagram schematically illustrating a video encoding apparatus according to an aspect of the present disclosure.

Hereinafter, embodiments of the present disclosure will be described in detail with reference to the accompanying drawings. In the following description, like reference numerals designate like elements although they are shown in different drawings. Further, in the following description of the present embodiments, a detailed description of known functions and configurations incorporated herein will be omitted for the purpose of clarity.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

A video encoding apparatus and a video decoding apparatus may correspond to a user terminal such as a PC (Personal Computer), a notebook computer, a PDA (Personal Digital Assistant), a PMP (Portable Multimedia Player), a PSP (PlayStation Portable), a wireless communication terminal, a smart phone, and the like, may correspond to a server terminal such as an application server, a service server, and the like, or may correspond to various devices including a communication device such as a communication modem that performs communication with various devices or wired/wireless communication networks, a memory that stores various programs and data that encode or decode an image or perform inter/intra-prediction for encoding or decoding, a microprocessor to execute a program so as to perform calculation and controlling, and the like.

In addition, an image that is encoded by the video encoding apparatus into a bit stream may be transmitted, to the video decoding apparatus in real time or non-real time, through a wired/wireless communication network such as the Internet, a wireless local area network, a wireless LAN, a WiBro (aka WiMax) network, a mobile communication network, and the like or through various communication interfaces such as a cable, a USB (Universal Serial Bus), and the like, and the bit stream may be decoded in the video decoding apparatus and may be reconstructed to an image, and the image may be played back.

In general, a moving picture is formed of a series of pictures, and each picture is divided into predetermined regions such as frames or blocks. A region of an image is divided into blocks, and the divided blocks may be classified into an intra-block and an inter-block based on an encoding scheme. The intra-block refers to a block that is encoded based on an intra-prediction coding scheme. The intra-prediction coding scheme predicts pixels of a current block using pixels of blocks that were encoded and decoded to be reconstructed in a current picture to which encoding is to be performed, so as to generate a predicted block, and encodes a differential value with the pixels of the current block. The inter-block refers to a block that is encoded based on an inter-prediction coding scheme. The inter-prediction coding scheme predicts a current block in a current picture referring to at least one past picture or future picture, so as to generate a predicted block, and encodes a differential value with the current block. Here, a frame that is referred to when the current picture is encoded or decoded may be referred to as a reference frame.

FIG. 1 is a block diagram schematically illustrating a video encoding apparatus according to an aspect of the present disclosure.

A video encoding apparatus 100 according to an aspect of the present disclosure includes an intra-predictor 110, a inter-predictor 120, a subtractor 130, a transformer and quantizer 140, an encoder 150, an inverse-quantizer and inverse-transformer 160, an adder 170, and a frame memory 180.

An input image desired to be encoded may be input based on a macro block unit. In the present disclosure, the macro block is in an M×N form, M and N may have a size of 2n, and M and N may be the same or may be different from each other. Therefore, the macro block may be larger or equal to a macro block of H.264.

The predictor (the intra-predictor 110 or the inter-predictor 120) generates a predicted block by predicting a current block. That is, the predictor (the intra-predictor 110 or the inter-predictor 120) may predict a pixel value of each pixel of the current block to which encoding is to be performed in an image, and may generate a predicted block having a predicted pixel value of each pixel. Here, the predictor (the intra-predictor 110 or the inter-predictor 120) may predict the current block through intra-prediction performed by the intra-predictor 110 or the inter-prediction performed by the inter-predictor 120.

The intra-predictor 110 generates a predicted block using adjacent pixels so as to predict a current macro block. That is, the intra-predictor 110 may generate the predicted block based on a mode of the intra-predictor 110 using adjacent pixels of a current macro block that already passes an encoding process and is decoded.

The inter-predictor 120 generates a predicted block using a different frame so as to predict a current macro block. That is, the inter-predictor 120 generates a motion vector through motion estimation based on a mode of the inter-predictor 120 in a previous frame that already passes through an encoding process and is decoded, and generates a predicted block in a motion compensation process using the motion vector.

The subtractor 130 generates a residual block by subtracting a predicted block from a current block. That is, the subtractor 130 calculates a difference between a pixel value of each pixel of the current block to which encoding is to be performed and a pixel value of the predicted block generated from the intra-predictor 110 or the inter-predictor 120, so as to generate the residual block having a residual signal in a form of a block.

The transformer and quantizer 140 transforms and quantizes the residual block generated from the subtractor 130 into a frequency coefficient so as to generate a transformed and quantized residual block. Here, as a transforming scheme, a scheme that transforms an image signal in a spatial region into a frequency domain may be used, such as Hadamard Transform, Discrete Cosine Transform Based Integer Transform (hereinafter referred to as 'Integer Transform'). As a quantizing scheme, DZUTQ (Dead Zone Uniform Threshold Quantization, hereinafter referred to as 'DZUTQ') or Quantization Weighted Matrix, and the like may be used.

The encoder 150 encodes the residual block transformed and quantized by the transformer and quantizer 140 so as to generate encoded data.

An Entropy Encoding scheme may be used as the encoding scheme, but this may not be limited thereto and various encoding schemes may be used.

Also, the encoder 150 includes, in the encoded data, a bit stream obtained by encoding quantized frequency coefficients and various information required for decoding the encoded bit stream. That is, the encoded data may include a first field including a bit stream obtained by encoding a CBP (Coded Block Pattern), a Delta Quantization Parameter and a quantization frequency coefficient, a second field including bits for information required for prediction (for example, an intra-prediction mode in the case of intra-prediction, a motion vector in the case of inter-prediction, and the like), and the like.

The inverse-quantizer and inverse-transformer 160 inverse-quantizes and inverse-transforms the transformed and quantized residual block that is transformed and quantized by the transformer and quantizer 140, so as to reconstruct a residual block. The inverse-quantization and inverse-transform may be the inverse process of the transform and quantization performed by the transformer and quantizer 140. That is, the inverse-quantizer and inverse-transformer 160 may perform inverse-quantization and inverse-transform by inversely performing the transform and quantization scheme performed by the transformer and quantizer 140 based on information associated with transform and quantization (for example, information associated with a transform and quantization type) that is generated and transferred from the transformer and quantizer 140.

The adder 170 reconstructs a current block by adding the predicted block predicted by the predictor (110 or 120) and the residual block inverse-quantized and inverse-transformed by the inverse-quantizer and inverse-transformer 160.

The frame memory 180 stores the block reconstructed by the adder 170, and uses the stored block as a reference block to generate a predicted block during intra or inter-prediction.

The inter-predictor 120 may split a current block into a plurality of partitions using one or more curves. Here, the curve may correspond to a set of a plurality of lines.

Figure 2:
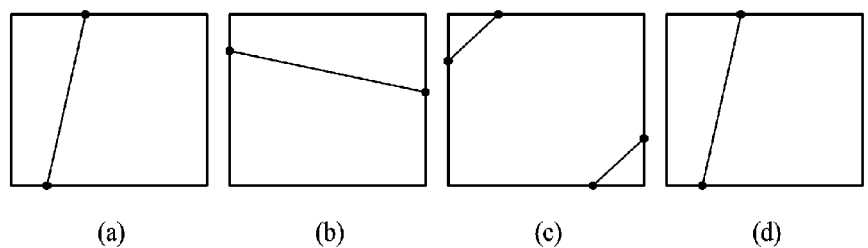
FIG. 2 is a diagram illustrating an example of splitting a current block using a line.

FIG. 2 is a diagram illustrating an example of splitting a current block using a line.

A first embodiment of the inter-predictor 120 generates split candidates by splitting a current block using a set of one or more lines connecting points on two sides of the current block, generates candidate blocks by performing prediction for each partition of the current block split by one or more lines with respect to each split candidate, and selects, as a predicted block, a candidate block having pixel values most similar to the current block from among the generated candidate blocks.

In this example, as illustrated in FIG. 2 at (a) to (d), a method that splits the current block in the inter-predictor 120 may split the current block into two parts using a single line as shown in FIGS. 2(*a*) and (*b*), and may split the current block into three parts using two lines as shown in FIGS. 2(*c*) and (*d*).

The inter-predictor 120 may generate candidate blocks by performing prediction for each partition with respect to each of the split candidates of FIG. 2 at (a) through (d).

Figure 3A:
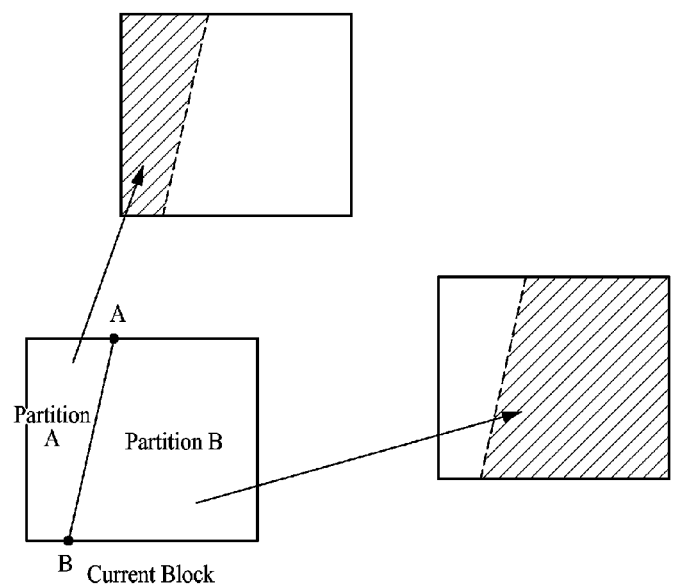
FIGS. 3A and 3B are diagrams illustrating a prediction operation for each partition.
Figure 3B:
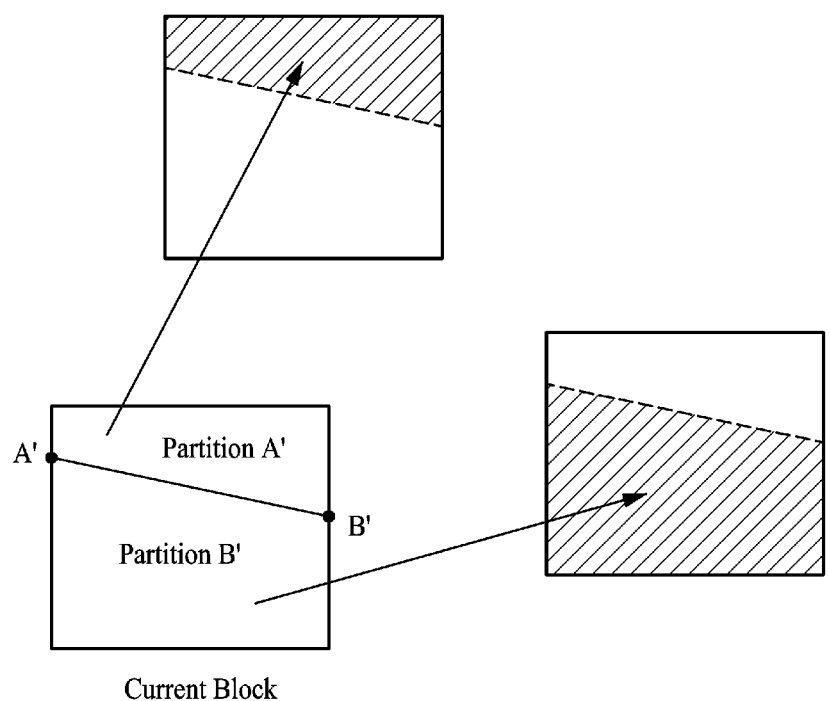

FIGS. 3A and 3B are diagrams illustrating a prediction operation for each partition.

As illustrated in FIG. 3A, prediction may be independently performed with respect to a partition A and a partition B split by a line AB, a predicted partition for the partition A and a predicted partition for the partition B, which have pixel values most similar to corresponding partitions, may be determined, and a block obtained by adding the predicted partition for the partition A and the predicted partition for the partition B may be determined to be a candidate block of a predicted block of a current block. Also, as illustrated in FIG. 3B, prediction may be independently performed with respect to a partition A' and a partition B' split by a line A'B', a predicted partition for the partition A' and a predicted partition for the partition B', which have pixel values most similar to corresponding partitions, may be determined, and a block obtained by adding the predicted partition for the partition A' and the predicted partition for the partition B' may be determined to be another candidate block of the predicted block of the current block. As illustrated in FIGS. 3A and 3B, a candidate block may be determined for each set of one or more lines.

In this example, a candidate block having pixel values most similar to the current block from among the candidate blocks respectively determined for sets of one or more lines may be determined to be the predicted block.

Here, a number of lines to be used for splitting the current block may be fixed to one, or may be variable so that one or two lines may be used. When a plurality of lines are used, the one or more lines that split the current block may be set to not intersect each other.

Also, setting of a predicted block for each partition may perform prediction with respect to a partition at the same location of a location of a partition of the current block, as illustrated in FIGS. 3A and 3B.

The encoder 150 encodes information associated with one or more lines used for generating a predicted block. Here, information associated with a line may correspond to location information associated with the line, that is, coordinate information associated with both end points of the line on the sides of a current block. For example, in a case where a mark of an upper side of a current block in a size of 16×16 is 1, a mark of a lower side of the current block is 2, when a line connects a $10^{th}$ pixel of the upper side 1 of the current block and an $8^{th}$ pixel of the lower side 2, information such as (1, 10) and (2, 8) may be encoded as location information associated with the line and may be transmitted to a decoding apparatus.

Figure 4:
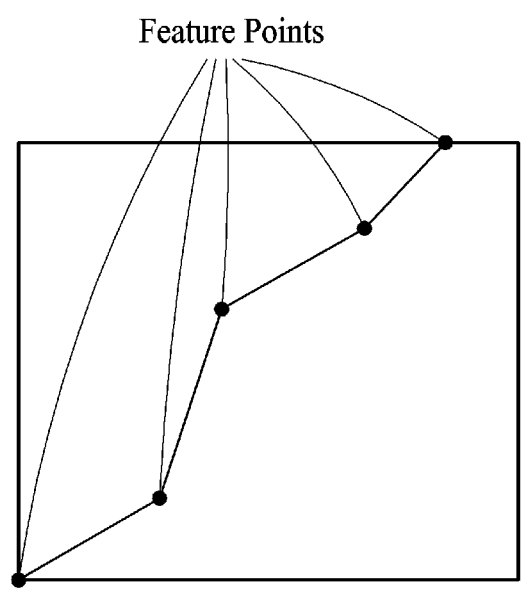
FIG. 4 is a diagram illustrating a set of lines connecting feature points of a current block.

FIG. 4 is a diagram illustrating a set of lines connecting feature points of a current block.

A second embodiment of the inter-predictor 120 extracts a predetermined number of feature points from a current block, selects a matching block having a distribution of feature points similar to a distribution of the extracted feature points, and performs prediction by setting the selected matching block to be a predicted block.

In this example, the encoder 150 may encode the information associated with feature points, and may transmit the encoded information to a decoding apparatus. In this example, the information associated with the feature points may correspond to location information associated with the feature points, that is, coordinates information associated with the feature points as illustrated in FIG. 4.

The encoder 150 may use, as the information associated with the feature points, a coefficient of a function that has the smallest error or variation from a set of lines connecting the feature points, as opposed to encoding the location information associated with the feature points.

For example, a polynomial expression of Equation 1 may be used as a function for fitting the set of lines connecting the feature points of the current block.

$$y = ax + bx^2 + cx^3 \qquad \text{Equation 1}$$

Coefficients of Equation 1, that is, a, b, and c, may be obtained by fitting the set of lines connecting the feature points of the current block into the polynomial expression of Equation 1. The encoder 150 may encode the coefficients a, b, and c obtained through Equation 1, and may transmit the encoded information to a decoding apparatus as the information associated with the feature points.

For reference, the function for fitting the set of lines connecting the feature points of the current block may not be limited to the polynomial expression of Equation 1, and various functions may be set for the use.

Figure 5:
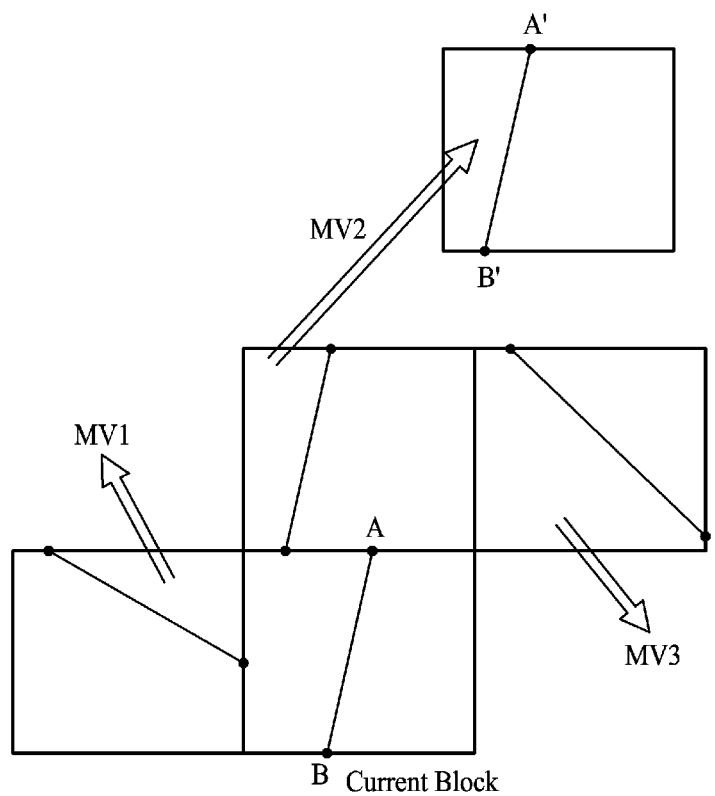
FIG. 5 is a diagram illustrating a case that extracts split information of a current block from a block referred to by a motion vector of an adjacent block.

FIG. 5 is a diagram illustrating a case that extracts split information of a current block from a block referred to by a motion vector of an adjacent block.

A third embodiment of the inter-predictor 120 generates a predicted motion vector from a motion vector of an adjacent block, extracts split information of a current block from a block referred to by the generated predicted motion vector, and generates a predicted block by predicting the current block based on the extracted split information.

As one of the methods of obtaining a predicted motion vector from a motion vector of an adjacent block in FIG. 5, a method that uses a median of motion vectors MV1, MV2, and MV3 of an adjacent block may be used. As illustrated in FIG. 5, when MV2 is selected as a predicted motion vector, the split information of the current block may be set to a line AB to be identical to split information (line A'B') of a block referred to by MV2. In this example, prediction may be performed for each partition of the current block split by the line AB, as illustrated in FIG. 3A or 3B, so as to generate the predicted block.

Here, the split information of the current block extracted from the reference block referred to by the predicted motion vector may correspond to location information (that is, coordinates information) associated with a line that splits the reference block as described in FIG. 5, or may correspond to location information associated with feature points extracted from the reference block referred to by the predicted motion vector as described in FIG. 4.

Figure 6:
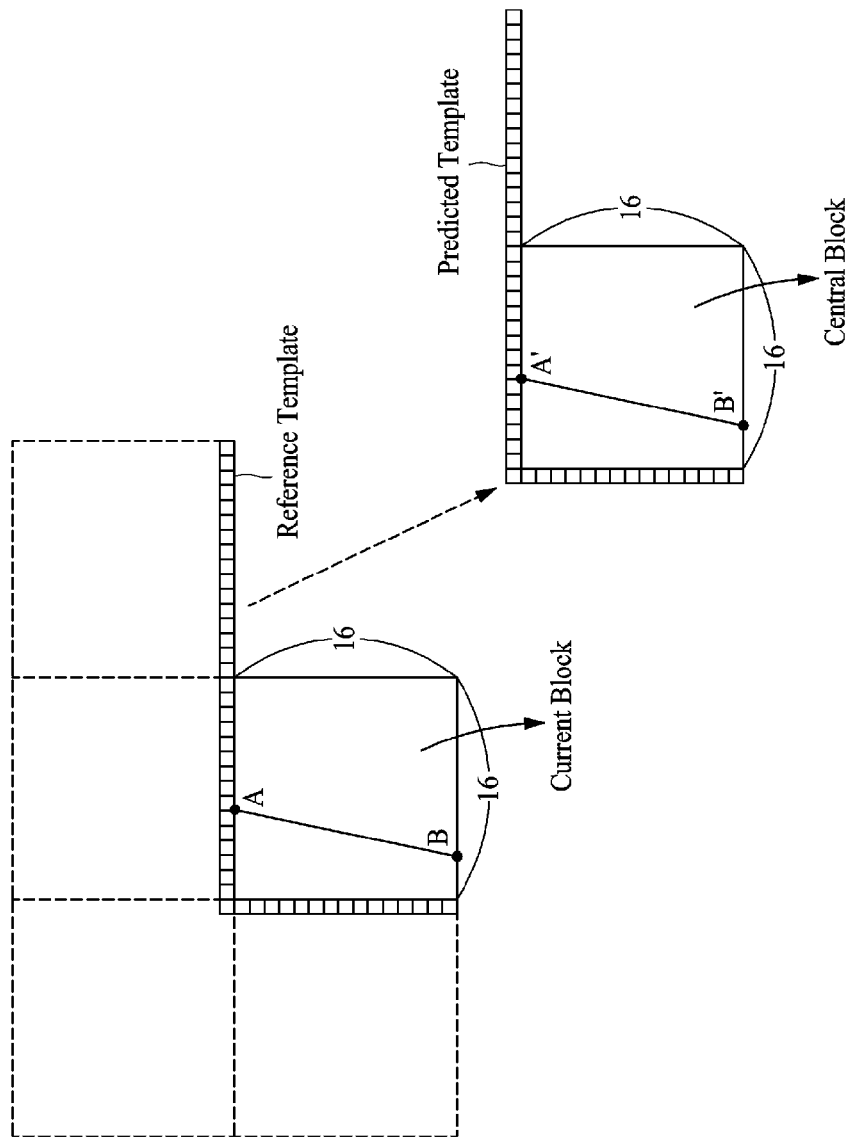
FIG. 6 is a diagram illustrating an extraction of split information of a current block from a reference template composed of values of adjacent block pixels as well as from a block referred to by a predicted template motion vector.

FIG. 6 is a diagram illustrating an extraction of split information of a current block from a reference template composed of values of adjacent block pixels as well as from a block referred to by a predicted template motion vector.

A fourth embodiment of the inter-predictor 120 generates a reference template using pixel information associated with an adjacent block, extracts, from a previously encoded block, a predicted template having pixel values with the smallest variation from the reference template, extracts split information of a current block from a central block of the extracted predicted template, and generates a predicted block by predicting the current block based on the extracted split information.

As illustrated in FIG. 6, a reference template provided in an 'L' shape may be generated from pixels of adjacent block of the current block. A set of pixels forming the reference template may be different for each embodiment.

The inter-predictor 120 extracts a predicted template having pixel values with the smallest variation from the reference template provided in the 'L' shape as shown in FIG. 6. Here, a calculation criterion for the predicted template selects a template having the smallest mean square error from pixel values forming the reference template, but various methods other than the mean square error method may be used.

The inter-predictor 120 calculates the predicted template, and may use split information of a central block of the predicted template as split information of a current block. As illustrated in FIG. 6, when the split information of the central block corresponds to a line A'B', the split information of the current block may be a line AB. In this example, prediction may be performed for each partition of the current block split by the line AB as shown in FIG. 3A or 3B, so as to generate a predicted block.

Here, the split information of the current block extracted from a reference block referred to by a predicted motion vector may correspond to location information (that is, coordinates information) associated with a line that splits a central block as described in FIG. 6, or may correspond to location information associated with feature points extracted from a central block as described in FIG. 4.

Figure 7:
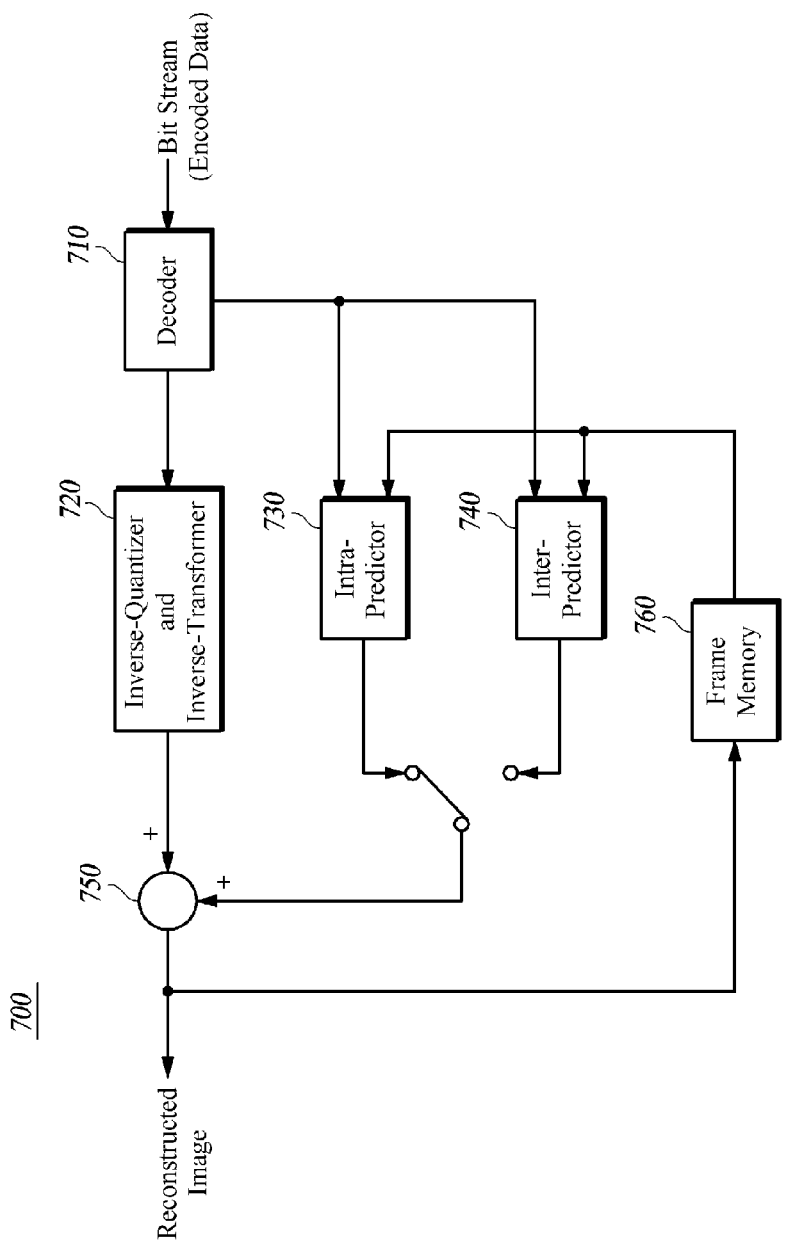
FIG. 7 is a block diagram schematically illustrating a configuration of a video decoding apparatus according to an aspect of the present disclosure.

FIG. 7 is a block diagram schematically illustrating a configuration of a video decoding apparatus according to an aspect of the present disclosure.

A video decoding apparatus 700 according to an aspect of the present disclosure is configured to include a decoder 710, an inverse-quantizer and inverse-transformer 720, an intra-predictor 730, an inter-predictor 740, an adder 750, and a frame memory 760.

The decoder 710 reconstructs a transformed and quantized residual block by receiving encoded data.

The decoder 710 decodes the encoded data so as to extract information required for block decoding. The decoder 710 may extract an encoded residual block from a first field included in the encoded data and may decode the encoded residual block, may extract information required for prediction from a second field included in the encoded data, and may transfer the extracted information required for prediction to the intra-predictor 730 or the inter-predictor 740.

The inverse-quantizer and inverse-transformer 720 inverse-quantizes and inverse-transforms the decoded transformed and quantized residual block so as to reconstruct a residual block.

The predictor (the intra-predictor 730 or the inter-predictor 740) generates a predicted block by predicting a current block. In this example, the corresponding predictor (the intra-predictor 730 or the inter-predictor 740) may predict the current block in the same manner as the predictor (intra-predictor 110 or the inter-predictor 120) of the video encoding apparatus 100.

The adder 750 reconstructs the current block by adding the residual block reconstructed by the inverse-quantizer and inverse-transformer 720 and the predicted block generated by the predictor 740. The current block reconstructed by the adder 750 may be transferred to the frame memory 760 and thus, may be utilized for predicting another block in the predictor (the intra-predictor 730 or the inter-predictor 740).

The frame memory 760 may store a reconstructed image and may be used for generating an intra and inter-predicted block.

The decoder 710 may decode the encoded data so as to decode or extract the transformed and quantized residual block and the information required for decoding. The information required for decoding may correspond to information required for decoding an encoded bit stream included in the encoded data, for example, information associated with a block type, information associated with an intra-prediction mode in a case where a prediction mode is an intra-prediction mode, information associated with a motion vector in a case where the prediction mode is an inter-prediction mode, information associated with a transform and quantization type, and the like, and may include various information other than those mentioned in the foregoing.

The inter-predictor 740 generates a predicted motion vector from a motion vector of an adjacent block of the current block, extracts split information of the current block from a block referred to by the generated predicted motion vector, and generates the predicted block by predicting the current block based on the extracted split information. Here, the split information may correspond to location information associated with a line that splits the block referred to by the predicted motion vector. Also, the split information may correspond to location information associated with feature points of the block referred to by the predicted motion vector. Here, operations of the inter-predictor 740 may be identical to operations of the third embodiment of the inter-predictor 120 in the video encoding apparatus 100 and thus, detailed descriptions thereof will be omitted.

The inter-predictor 740 generates a reference template using pixel information of an adjacent block, extracts, from a previously encoded block, a predicted template having pixel values with the smallest variation from the reference template, extracts split information of the current block from a central block of the extracted predicted template, and generates the predicted block by predicting the current block based on the extracted split information. Here, the split information may correspond to location information associated with a line that splits the central block or may correspond to location information associated with feature points of the central block. Here, operations of the inter-predictor 740 may be identical to operations of the fourth embodiment of the inter-predictor 120 of the video encoding apparatus 100 and thus, detailed descriptions thereof will be omitted.

The decoder 710 may additionally reconstruct split information from the encoded data.

In this example, the inter-predictor 740 generates partitions of the current block by extracting, from the reconstructed split information, one or more lines connecting points on two sides of the current block, and generates the predicted block by performing prediction for each partition. In this example, prediction may be performed with respect to a partition at the same location as a location of a partition of the current block. Here, operations of the inter-predictor 740 may generate a predicted block by predicting for each partition as described in FIG. 3A or 3B and thus, detailed descriptions thereof will be omitted.

Also, when the split information is additionally reconstructed from the encoded data, the decoder 710 extracts a predetermined number of feature points in the current block from the reconstructed split information, selects a matching block having a distribution of feature points similar to a distribution of the extracted feature points, and generates the selected matching block to be the predicted block. In this example, the information associated with extracted feature points may correspond to location information associated with feature points or may correspond to a coefficient of a function having the smallest variation from a set of lines connecting adjacent feature points. Here, operations of the inter-predictor 740 may be identical to the second embodiment of the inter-predictor 120 of the video encoding apparatus 100 and thus, detailed descriptions thereof will be omitted.

The video encoding/decoding apparatus according to an aspect of the present disclosure may be embodied by connecting an encoding data output end of the video encoding apparatus 100 of FIG. 1 to an encoded data input end of the video decoding apparatus 700 of FIG. 7.

A video encoding/decoding apparatus according to an aspect of the present disclosure includes a video encoder to split a current block into a plurality of partitions using one or more curves, to generate a predicted block by performing prediction for each split partition, to generate a residual block by subtracting the predicted block from the current block, to generate a transformed and quantized residual block by transforming and quantizing the residual block, and to encode the transformed and quantized residual block and a video decoder to reconstruct split information of a current block and a transformed and quantized residual block by receiving encoded data, to reconstruct a residual block by inverse-quantizing and inverse-transforming the reconstructed transformed and quantized residual block, to extract split information from adjacent block information or the encoded data, to generate a predicted block by predicting the current block for each partition based on the split information, and to reconstruct the current block by adding the reconstructed residual block and the predicted block.

Here, the video encoder may be embodied as the video encoding apparatus 100 according to an aspect of the present disclosure, and the video decoder may be embodied as the video decoding apparatus 700 according to an aspect of the present disclosure.

A video encoding method according to the first embodiment of the present disclosure includes an inter-prediction step S810 to generate split candidates by splitting a current block using a set of one or more lines connecting points on two sides of the current block, to generate candidate blocks by performing prediction for each partition of the current block split by the one or more lines with respect to each split candidate, to generate, to be a predicted block, a candidate block that has pixel values most similar to the current block from among the generated candidate blocks, a subtraction step S820 to generate a residual block by subtracting the predicted block from the current block, a transform and quantization step S830 to generate a transformed and quantized residual block by transforming and quantizing the residual block, and an encoding step S840 to encode the transformed and quantized residual block.

Here, the inter-prediction step S810 corresponds to operations of the first embodiment of the inter-predictor 120, the subtraction step S820 corresponds to operations of the subtractor 130, the transform and quantization step S830 corresponds to operations of the transformer and quantizer 140, and the encoding step S840 corresponds to operations of the encoder 150 and thus, detailed descriptions thereof will be omitted.

A video encoding method according to the second embodiment of the present disclosure includes an inter-prediction step S910 to generate split candidates by splitting a current block using a set of one or more lines connecting points on two sides of the current block, to generate candidate blocks by performing prediction for each partition of the current block split by the one or more lines with respect to each split candidate, to generate, to be a predicted block, a candidate block that has pixel values most similar to the current block from among the generated candidate blocks, a subtraction step S920 to generate a residual block by subtracting the predicted block from the current block, a transform and quantization step S930 to generate a transformed and quantized residual block by transforming and quantizing the residual block, and an encoding step S940 to encode the transformed and quantized residual block.

Here, the inter-prediction step S910 corresponds to operations of the second embodiment of the inter-predictor 120, the subtraction step S920 corresponds to operations of the subtractor 130, the transform and quantization step S930 corresponds to operations of the transformer and quantizer 140, and the encoding step S940 corresponds to operations of the encoder 150 and thus, detailed descriptions thereof will be omitted.

A video encoding method according to the third embodiment of the present disclosure includes an inter-prediction step S1010 to generate a predicted motion vector from a motion vector of an adjacent block, to extract split information of a current block from a block referred to by the predicted-motion vector, to generate a predicted block by predicting the current block based on the split information, a subtraction step S1020 to generate a residual block by subtracting the predicted block from the current block, a transform and quantization step S1030 to generate a transformed and quantized residual block by transforming and quantizing the residual block, and an encoding step S1040 to encode the transformed and quantized residual block.

Here, the inter-prediction step S1010 corresponds to operations of the third embodiment of the inter-predictor 120, the subtraction step S1020 corresponds to operations of the subtractor 130, the transform and quantization step S1030 corresponds to operations of the transformer and quantizer 140, and the encoding step S1040 corresponds to operations of the encoder 150 and thus, detailed descriptions thereof will be omitted.

A video encoding method according to the fourth embodiment of the present disclosure includes an inter-prediction step S1110 to generate a reference template based on pixel information associated with an adjacent block, to extract, from a previously encoded block, a predicted template having pixel values with the smallest variation from the reference template, to extract split information of a current block from a central block of the predicted template, and to generate a predicted block by predicting the current block based on the split information, a subtraction step S1120 to generate a residual block by subtracting the predicted block from the current block, a transform and quantization step S1130 to generate a transformed and quantized residual block by transforming and quantizing the residual block, and an encoding step S1140 to encode the transformed and quantized residual block.

Here, the inter-prediction step S1110 corresponds to operation of the fourth embodiment of the inter-predictor 120, the subtraction step S1120 corresponds to operations of the subtractor 130, the transform and quantization step S1130 corresponds to operations of the transformer and quantizer 140, and the encoding step S1140 corresponds to operations of the encoder 150 and thus, detailed descriptions thereof will be omitted.

A video decoding method according to the first embodiment of the present disclosure includes a decoding step S1210 to reconstruct split information of a current block and a transformed and quantized residual block by receiving encoded data, an inverse-quantization and inverse-transform step S1220 to reconstruct a residual block by inverse-quantizing and inverse-transforming the transformed and quantized residual block, an inter-prediction step S1230 to generate a predicted block by predicting the current block for each partition based on the split information, and an adding step S1240 to reconstruct the current block by adding the reconstructed residual block and the predicted block.

Here, the decoding step S1210 corresponds to operations of the decoder 710, the inverse-quantization and inverse-transform step S1220 corresponds to operations of the inverse-quantizer and inverse-transformer 720, the inter-prediction step S1230 corresponds to operations of the inter-predictor 740, and the adding step S1240 corresponds to operations of the adder 750 and thus, detailed descriptions thereof will be omitted.

A video decoding method according to the second embodiment of the present disclosure includes a decoding step S1310 to reconstruct a transformed and quantized residual block by receiving encoded data, an inverse-quantization and inverse-transform step S1320 to reconstruct a residual block by inverse-quantizing and inverse-transforming the transformed and quantized residual block, an inter-prediction step S1330 to extract split information of a current block from an adjacent block, to generate a predicted block by predicting the current block for each partition based on the split information, and an adding step S1340 to reconstruct the current block by adding the reconstructed residual block and the predicted block.

Here, the decoding step S1310 corresponds to operations of the decoder 710, the inverse-quantization and inverse-transform step S1320 corresponds to operations of the inverse-quantizer and inverse-transformer 720, the inter-prediction step S1330 corresponds to operations of the inter-predictor 740, and the adding step S1340 corresponds to operations of the adder 750 and thus, detailed descriptions thereof will be omitted.

The video encoding/decoding method according to an aspect of the present disclosure may be embodied by coupling the video encoding method according to an aspect of the present disclosure and the video decoding method according to an aspect of the present disclosure.

A video encoding/decoding method according to an aspect of the present disclosure includes a video encoding step to split a current block into a plurality of partitions using one or more curves, to generate a predicted block by performing prediction for each split partition, to generate a residual block by subtracting the predicted block from the current block, to generate a transformed and quantized residual block by transforming and quantizing the residual block, and to encode the transformed and quantized residual block, and a video decoding step to reconstruct a transformed and quantized residual block by receiving encoded data, to reconstruct a residual block by inverse-quantizing and inverse-transforming the reconstructed transformed and quantized residual block, to extract split information from adjacent block information or the encoded data, to generate a predicted block by predicting a current block for each partition based on the split information, and to reconstruct the current block by adding the reconstructed residual block and the predicted block.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for providing a superior restored image quality through improving the performance of video data compression by splitting a block into various shapes in addition to a conventional standardized rectangular shape so as to effectively predict an image of a current block from a previous image in a motion image predicting process of a data compressing apparatus.

The invention claimed is:

1. A video encoding apparatus for encoding a current block which is located in a current frame, the apparatus comprising:
   an inter-predictor configured to
      generate a reference template surrounding at least two sides of the current block, the reference template comprised of pixels within one or more pre-encoded adjacent blocks in the current frame which are adjacent to the current block, wherein the reference template does not include pixels in the current block,
      search for, in a previously encoded reference frame other than the current frame, a predicted template which has a shape corresponding to the reference template and pixel values similar to the reference template, and
      set split information of the current block as split information of a central block surrounded by pixels in the predicted template, and generate a predicted block by predicting each partition divided from the current block based on the split information of the current block;
   a subtractor configured to generate a residual block by subtracting the predicted block from the current block;
   a transformer and quantizer configured to generate a transformed and quantized residual block by transforming and quantizing the residual block; and
   an encoder configured to encode the transformed and quantized residual block, without encoding the split information of the current block.

2. The apparatus of claim 1, wherein the split information corresponds to location information associated with a line that splits the central block.

3. The apparatus of claim 1, wherein the split information corresponds to location information associated with a feature point of the central block.

4. A video decoding apparatus for decoding a current block which is located in a current frame, the apparatus comprising:
   a decoder configured to reconstruct a transformed and quantized residual block by receiving encoded data, wherein split information of the current block is not reconstructed from the encoded data;
   an inverse-quantizer and inverse-transformer configured to reconstruct a residual block by inverse-quantizing and inverse-transforming the transformed and quantized residual block;
   an inter-predictor configured to extract the split information of the current block from one or more pre-decoded adjacent blocks of the current block, and generate a predicted block by predicting each partition divided from the current block based on the split information of the current block; and
   an adder configured to reconstruct the current block by adding the reconstructed residual block and the predicted block,
   wherein the inter-predictor is configured to
      generate a reference template surrounding at least two sides of the current block, the reference template comprised of pixels within the one or more pre-decoded adjacent blocks in the current frame which are adjacent to the current block, wherein the reference template does not include pixels in the current block, search for, in a previously decoded reference frame other than the current frame, a predicted template which has a shape corresponding to the reference template and pixel values similar to the reference template, and set the split information of the current block as split information of a central block surrounded by pixels in the predicted template, and generate the predicted block by predicting each partition divided from the current block based on the split information of the current block.

5. The apparatus of claim 4, wherein the split information corresponds to location information of a line that splits the central block.

6. The apparatus of claim 4, wherein the split information corresponds to location information associated with a feature point of the central block.

7. A video decoding method for decoding a current block which is located in a current frame, the method comprising:

reconstructing a transformed and quantized residual block by receiving encoded data, wherein split information of the current block is not reconstructed from the encoded data;

reconstructing a residual block by inverse-quantizing and inverse-transforming the transformed and quantized residual block;

generating a predicted block by extracting the split information of the current block from one or more pre-decoded adjacent blocks divided from the current block, and by predicting each partition of the current block based on the split information of the current block; and reconstructing the current block by adding the reconstructed residual block and the predicted block, wherein the generating of the predicted block comprises:

generating a reference template surrounding at least two sides of the current block, the reference template comprised of pixels within the one or more pre-decoded adjacent blocks in the current frame which are adjacent to the current block, wherein the reference template does not include pixels in the current block;

searching for, in a previously decoded reference frame other than the current frame, a predicted template which has a shape corresponding to the reference template and pixel values similar to the reference template, and setting the split information of the current block as split information of a central block surrounded by pixels in the predicted template, and generating the predicted block by predicting each partition of the current block based on the split information of the current block.

8. The method of claim 7, wherein the split information corresponds to location information of a line that splits the central block.

9. The method of claim 7, wherein the split information corresponds to location information associated with a feature point of the central block.

* * * * *